(12) United States Patent
Shin et al.

(10) Patent No.: US 7,487,021 B2
(45) Date of Patent: Feb. 3, 2009

(54) METHOD FOR DETERMINING ESTIMATED VEHICLE DYNAMICS PARAMETERS

(75) Inventors: Kwang-Keun Shin, Rochester Hills, MI (US); Yuen-Kwok Chin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 4 days.

(21) Appl. No.: 11/838,025

(22) Filed: Aug. 13, 2007

(65) Prior Publication Data

US 2007/0276564 A1    Nov. 29, 2007

Related U.S. Application Data

(62) Division of application No. 10/863,956, filed on Jun. 9, 2004, now Pat. No. 7,349,778.

(51) Int. Cl.
*B62D 6/00* (2006.01)

(52) U.S. Cl. ...................................................... 701/41

(58) Field of Classification Search .................... 701/41
See application file for complete search history.

(56) References Cited

U.S. PATENT DOCUMENTS

| | | | |
|---|---|---|---|
| 5,251,137 A * | 10/1993 | Chin et al. | 701/72 |
| 5,275,474 A * | 1/1994 | Chin et al. | 303/148 |
| 5,765,118 A * | 6/1998 | Fukatani | 701/72 |
| 5,895,433 A * | 4/1999 | Chen et al. | 701/41 |
| 5,931,887 A * | 8/1999 | Hac | 701/71 |
| 5,941,919 A * | 8/1999 | Pastor et al. | 701/36 |
| 6,035,251 A * | 3/2000 | Hac et al. | 701/70 |
| 6,112,147 A * | 8/2000 | Ghoneim et al. | 701/80 |
| 6,134,509 A * | 10/2000 | Furusho et al. | 702/167 |
| 6,161,905 A * | 12/2000 | Hac et al. | 303/146 |
| 6,195,606 B1 * | 2/2001 | Barta et al. | 701/70 |
| 6,508,102 B1 * | 1/2003 | Margolis et al. | 73/8 |

(Continued)

OTHER PUBLICATIONS

H. E. Tseng, D. Madau, B. Ashrafi, T. Brown, D. Recker. Technical Challenges in The Development of Vehicle Stability Control System. This paper appears in: Control Applications, 1999. Proceedings of the 1999 IEEE International Conference on Publication Date: 1999. vol. 2, On pp. 1660-1666 vol. 2 Meeting Date: Aug. 22, 1999-Aug. 27, 1999.*

(Continued)

*Primary Examiner*—Jack W Keith
*Assistant Examiner*—Ari M Diacou

(57) ABSTRACT

A method for determining estimated vehicle dynamics parameters using a vehicle parameter estimator, a vehicle condition detector and a rich steering input detector for estimating vehicle understeer coefficient and front and rear cornering compliances in real time. The vehicle parameter estimator receives a front wheel steering angle signal, a rear wheel steering angle signal, a vehicle lateral acceleration signal, a vehicle yaw rate signal and a vehicle speed signal, and employs a linear parameter estimation algorithm for estimating the understeer coefficient, and the front and rear corning compliance. The vehicle condition detector receives the front wheel steering angle signal, the rear wheel steering angle signal, the vehicle yaw rate signal and the vehicle speed signal, and disables the vehicle parameter estimator if the vehicle is not operating in a linear region. The rich steering input detector determines whether the estimated vehicle parameters are reliable and are ready to be used.

13 Claims, 7 Drawing Sheets

U.S. PATENT DOCUMENTS

| | | | | |
|---|---|---|---|---|
| 6,547,343 | B1* | 4/2003 | Hac | 303/146 |
| 2002/0128770 | A1* | 9/2002 | Ooishi | 701/207 |
| 2002/0143451 | A1* | 10/2002 | Hac et al. | 701/48 |
| 2002/0195293 | A1* | 12/2002 | Will | 180/445 |
| 2003/0130775 | A1* | 7/2003 | Lu et al. | 701/36 |
| 2004/0148077 | A1* | 7/2004 | Yasui et al. | 701/41 |

OTHER PUBLICATIONS

M. Arndt, E. L. Ding and T. Massel. Identification of Cornering Stiffness During Lane Change Maneuvers. This paper appears in: Control Applications, 2004. Proceedings of the 2004 IEEE International Conference on. Publication Date: Sep. 2-4, 2004 vol. 1, On pp. 344-349 vol. 1.*

Rusty Anderson and David M. Bevly. Estimation of Tire Cornering Stiffness Using GPS to Improve Model Based Estimation of Vehicle States. This paper appears in: Intelligent Vehicles Symposium, 2005. Proceedings. IEEE Publication Date: Jun. 6-8, 2005 On pp. 801-806.*

* cited by examiner

METHOD FOR DETERMINING ESTIMATED VEHICLE DYNAMICS PARAMETERS

CROSS-REFERENCE TO RELATED APPLICATIONS

This application is a Divisional application of U.S. patent application Ser. No. 10/863,956, filed Jun. 9, 2004, titled "Real-Time Vehicle Dynamics Estimation System."

BACKGROUND OF THE INVENTION

1. Field of the Invention

This invention relates generally to a method for determining estimated vehicle dynamics parameters and, more particularly, to a method for determining estimated vehicle dynamics parameters that employs a vehicle parameter estimator, a vehicle condition detector and a rich steering input detector for providing an estimated vehicle understeer coefficient, front cornering compliance and rear cornering compliance in real time.

2. Discussion of the Related Art

Vehicles are designed so that the vehicle handling response complies with certain design specifications. Vehicle dynamic parameters define the vehicle handling response, and therefore, nominal parameters define a nominal vehicle handling response. The vehicle dynamic parameters of understeer coefficient, front cornering compliance and rear cornering compliance are the most dominant dynamic parameters for determining the stability and dynamic handling behavior of a vehicle. The understeer coefficient defines the vehicle yaw rate or turning radius for a particular steering angle. The front cornering compliance and the rear cornering compliance define the distribution of the side-slip to the front and rear axle when the vehicle is turning. The cornering compliances include the ratio defined by the steering angle and the lateral force of the wheels. These parameters vary according to different vehicle loading, tire pressure, tire wear, and vehicle-to-vehicle variations of suspension characteristics, etc.

Parameter deviations from the nominal values may cause performance degradation of the chassis/vehicle control systems. For example, as the vehicle ages, the various dynamic parameters change, resulting in a change in the turning radius of the vehicle in response to the same steering angle. It would be desirable to monitor the vehicle dynamic parameters to determine if a problem exists so that suitable steps could be taken. The theory of real-time estimation of a dynamic system is known, and there have been several attempts to estimate vehicle dynamic parameters. The known theories are not feasible enough to be applied to a real vehicle system because they do not properly account for the issues of non-linearity and input richness. These issues can be resolved and the estimation algorithm can be improved.

SUMMARY OF THE INVENTION

In accordance with the teachings of the present invention, a method for determining estimated vehicle dynamics parameters is disclosed that uses a vehicle parameter estimator, a vehicle condition detector and a rich steering input detector for estimating vehicle understeer coefficient and front and rear cornering compliances in real time. The vehicle parameter estimator receives a front wheel steering angle signal, a rearwheel steering angle signal, a vehicle lateral acceleration signal, a vehicle yaw rate signal and a vehicle speed signal, and employs a linear parameter estimation algorithm for estimating the understeer coefficient, the front cornering compliance and the rear cornering compliance. The vehicle condition detector receives the front wheel steering angle signal, the rear wheel steering angle signal, the vehicle yaw rate signal and the vehicle speed signal, and disables the vehicle parameter estimator if the vehicle is not operating in a linear region. The rich steering input detector receives the front wheel angle signal, the rear wheel angle signal and the vehicle speed signal, and provides an output signal indicating whether the estimated parameters are reliable enough.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining estimated vehicle dynamic parameters is merely exemplary in nature, and is in no way intended to limit the invention or its applications or uses.

According to the invention, a real-time vehicle dynamics estimation system is provided that estimates a vehicle understeer coefficient and front and rear cornering stiffness by signals from standard dynamic sensor measurements, such as vehicle speed $V_X$, front wheel steering angle $\delta_F$, rear wheel steering angle $\delta_R$, vehicle yaw rate YR and vehicle lateral acceleration Ay. The real-time vehicle dynamics estimation system of the invention can be combined with a vehicle stability enhancement system using differential braking, active rear-wheel steering, active front-wheel steering or any combination of these systems. Based on the estimations results, the dynamics estimation system can modify the vehicle stability enhancement system to compensate for performance degradation due to vehicle parameter variations, or can send a warning signal to the vehicle operator for maintenance purposes.

Figure 1:
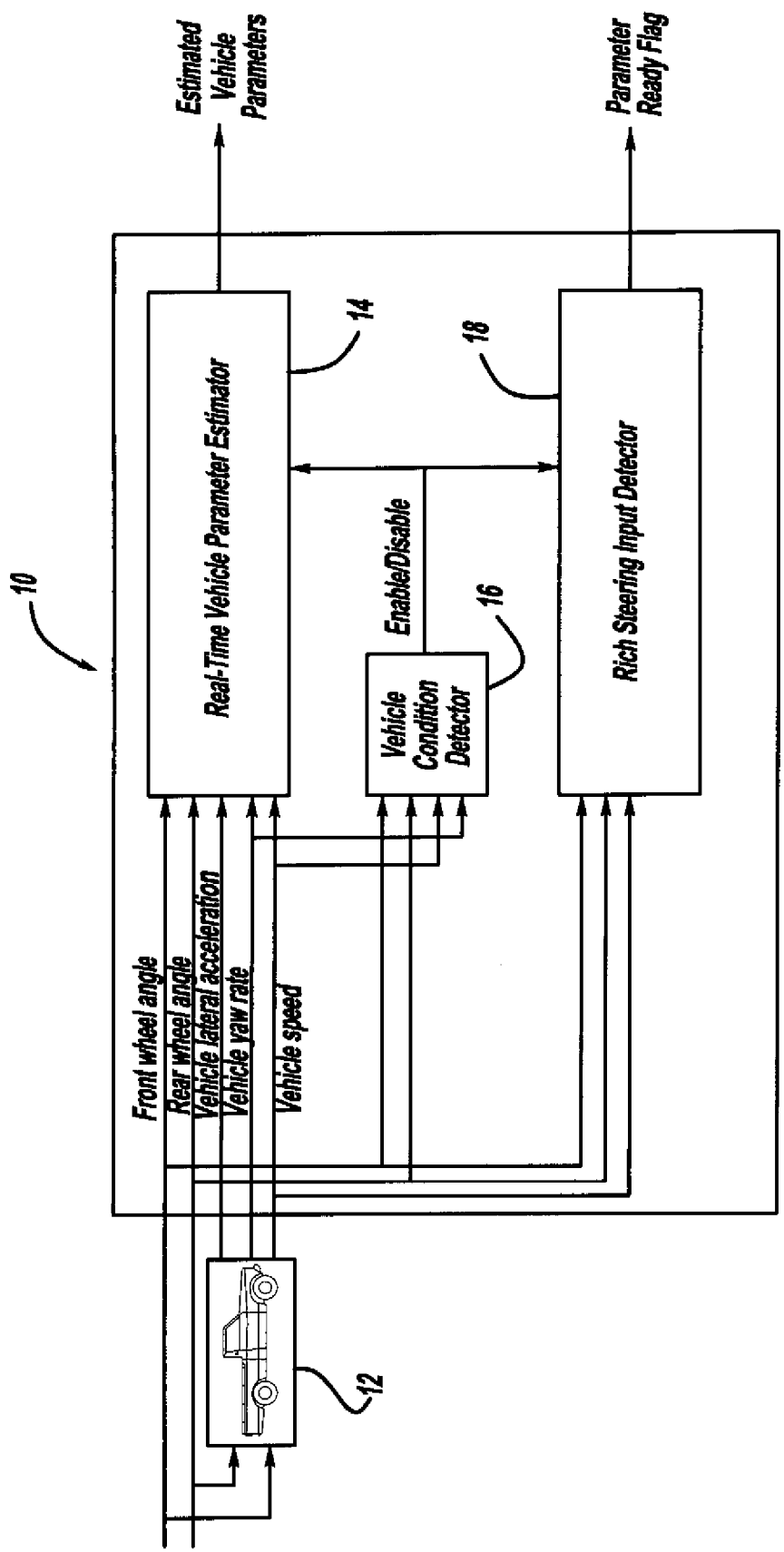
FIG. 1 is a block diagram of a real-time vehicle dynamics estimation system, according to an embodiment of the present invention.

FIG. 1 is a block diagram of a real-time vehicle dynamics estimation system 10 for a vehicle 12, according to an embodiment of the present invention. The system 10 includes a real-time vehicle parameter estimator 14, a vehicle condition detector 16 and a rich steering input detector 18 all described in detail below. The parameter estimator 14 receives sensor inputs from the vehicle 12 including the front wheel steering angle $\delta_F$, the rear wheel steering angle $\delta_R$, the vehicle lateral acceleration Ay, the vehicle yaw rate YR and the vehicle speed Vx, and generates estimated vehicle dynamics parameter outputs, specifically vehicle understeer coefficient, front cornering compliance and rear cornering compliance. The sensors that provide these measurements are well known in the art, and any sensor suitable for these purposes can be employed. The estimated vehicle parameters can be used by a vehicle controller to provide warning indicators, maintenance indicators, or adapt the vehicle parameters if the vehicle parameters are outside a nominal operating range.

The parameter estimator 14 operates on a linear vehicle model. Therefore, the inputs to the parameter estimator 14 from the various sensors should be from the linear operating region. If the vehicle 12 is out of the linear operating region, the linear correlation between steering and the sensor measurements are not valid, resulting in unrealistic results from the parameter estimator 14. When the vehicle 12 is not operating in the linear region, the estimator 10 should therefore be disabled. The vehicle condition detector 16 receives the sensor signals of the front wheel steering angle $\delta_F$, the rear wheel steering angle $\delta_R$, the vehicle yaw rate YR and the vehicle speed Vx. The detector 16 processes these input signals to determine if the vehicle 12 is operating in the linear region, and provides an output signal as to whether to enable or disable the parameter estimator 14 and the rich steering input detector 18.

The conversion of the parameter estimation depends on input excitation. When the input excitation is not rich enough, i.e., the vehicle 12 is not turning frequently enough, the estimated vehicle parameters do not converge to the right value. However, it is difficult for the real-time vehicle parameter estimator 14 to determine whether the estimated vehicle parameters are converged or not. The rich steering input detector 18 receives the front wheel steering angle signal $\delta_F$, the rear wheel steering angle signal $\delta_R$ and the vehicle speed Vx, and determines the conversion of the estimated vehicle parameters.

Figure 2:
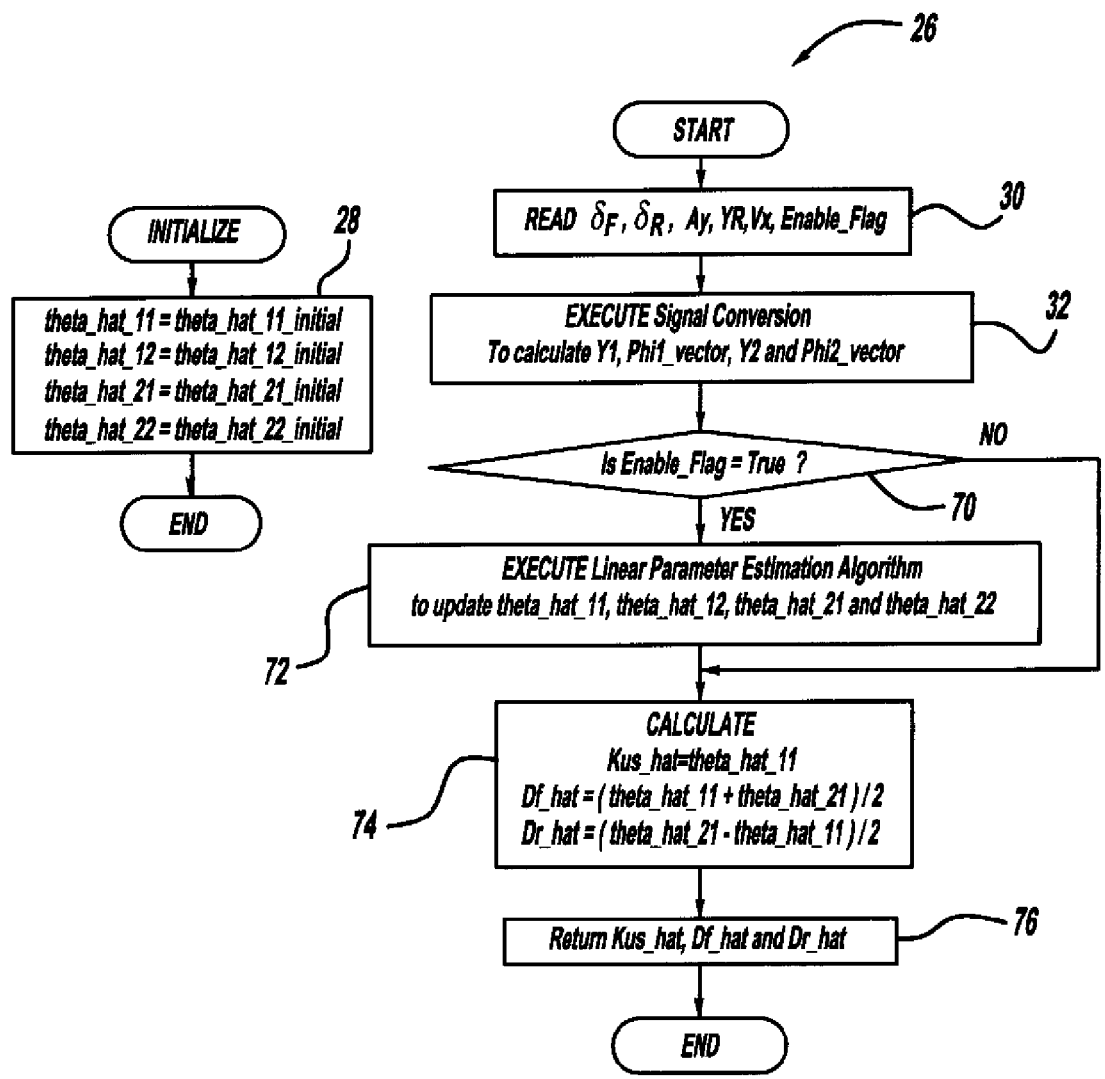
FIG. 2 is a flow chart diagram illustrating the operation of a vehicle parameter estimator of the system shown in FIG. 1.

FIG. 2 is a flow chart diagram 26 showing the operation of the real-time vehicle parameter estimator 14. The estimator 14 initializes theta_hat_11, theta_hat_12, theta_hat_21 and theta_hat_22 to initial values at box 28. Theta_hat_11, theta_hat 12, theta_hat_21 and theta_hat_22 are estimation values produced by a linear parameters estimation algorithm in the parameter estimator 14 to determine the understeer coefficient, rear cornering compliance and front cornering compliance, as will be discussed below. The initial values are predetermined values that give an initial understeer coefficient, an initial front cornering compliance and an initial rear cornering compliance for the original or new design of the vehicle 12. The estimator 14 then reads the front wheel steering angle $\delta_F$, the rear wheel steering angle $\delta_R$, the vehicle lateral acceleration Ay, the vehicle yaw rate YR, the vehicle speed Vx, and the enable flag from the detector 18 at box 30. The estimator 14 executes a signal conversion procedure to convert the raw sensor signals into linear regression forms of Y1=Phi1_vector-theta1 and Y2=Phi2_vector-theta2, defined below, that are more suitable for the estimation algorithm at box 32.

Figure 3:
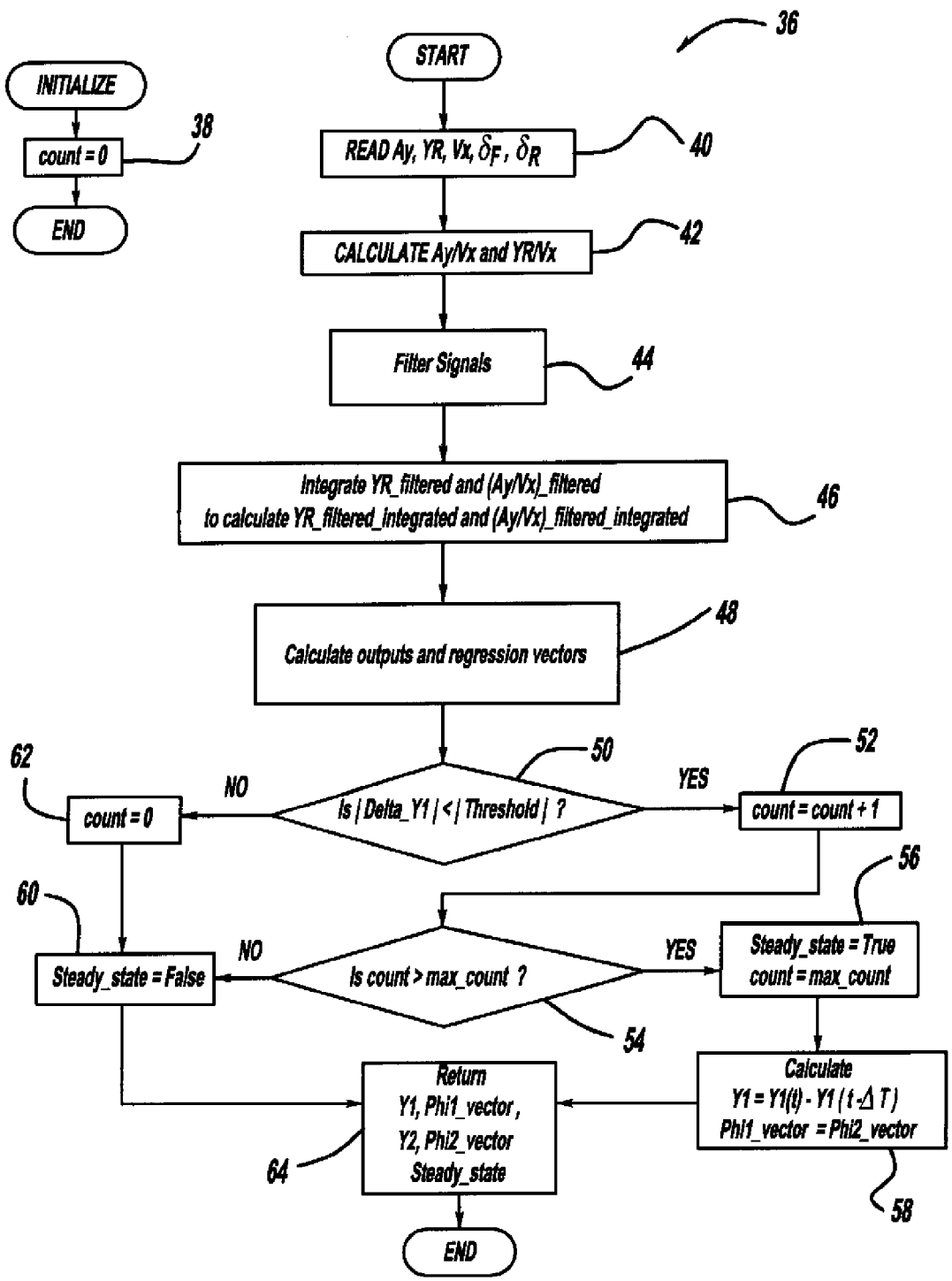
FIG. 3 is a flowchart diagram showing a signal conversion process for the vehicle parameter estimator of the system shown in FIG. 1.

FIG. 3 is a flow chart diagram 36 showing the conversion procedure at the box 32. The estimator 14 initializes a count to zero at box 38, and reads the sensor signals for the front wheel steering angle $\delta_F$, the rear wheel steering angle $\delta_R$, the lateral acceleration Ay, the vehicle yaw rate YR and the vehicle speed Vx at box 40. The estimator 14 then divides the lateral acceleration signal by the vehicle speed signal (Ay/Vx) and the vehicle yaw rate signal by the vehicle speed signal (YR/Vx) at box 42. The front wheel steering angle signal $\delta_F$, the rear wheel steering angle signal $\delta_R$, the lateral acceleration signal Ay, the vehicle yaw rate signal YR, the vehicle speed signal Vx, the Ay/Vx value and the YR/Vx value are input into a bank of low pass derivative filters at box 44. The derivative filters generate filtered signals, filtered derivative signals and filtered second derivative signals for these values, particularly, Ay_filtered, Ay_dot filtered, YR_filtered, YR_dot_filtered, YR_2dot_filtered, (Ay/Vx)_filtered, (YR/Vx)_filtered, (YR/Vx)_dot_filtered, $\delta_F$_filtered, $\delta_F$_dot_filtered, $\delta_R$_filtered, and $\delta_R$_dot_filtered at box 44, where "dot" is the first derivative and "2dot" is the second derivative.

The estimator 14 integrates YR_filtered and (Ay/Vx)_filtered to obtain YR_filtered_integrated and (Ay/Vx)_filtered_integrated at box 46. The estimator 14 then calculates the regression vectors Phi1_vector and Phi2_vector and the values Y1 and Y2 at box 48 as:

$$Y1 = g^*(\delta_F\_\text{filtered} + \delta_R\_\text{filtered} - (a+b)^*(YR/Vx)\_\text{filtered})$$

$$Phi1\_\text{vector} = \{Ay\_\text{filtered}(t) - Ay\_\text{filtered}(t-\Delta t),\ YR\_\text{dot}\_\text{filtered}(t) - YR\_\text{dot}\_\text{filtered}(t-\Delta t)\}$$

$$Temp = g^*(\delta_F\_\text{filtered} - \delta_R\_\text{filtered} + 2^*YR\_\text{filtered}\_\text{integrated} - 2^*(Ay/Vx)\_\text{filtered}\_\text{integrated} - (a-b)^*(YR/Vx)\_\text{filtered})$$

$$Y2 = Temp(t) - Temp(t-\Delta t)$$

$$Phi2\_\text{vector} = Phi1\_\text{vector}(t) - Phi1\_\text{vector}(t-\Delta t)$$

$$\text{Delta}\_Y1 = Y1(t) - Y1(t-\Delta t) \qquad (1)$$

The values a, b and g are the distance from the front axle of the vehicle 12 to the lateral acceleration measurement point, the distance from the rear axle to the lateral acceleration measurement point and a gravitational constant, respectively. Also, (t) denotes current data and (t−Δt) denotes the data from the previous step. The outputs Y1 and Y2 and the regression vectors Phi1_vector and Phi2_vector are used at the box 32 as the converted data to calculate the linear regression forms of Y1 and Y2.

The estimator 14 then determines whether a steady state turning condition is met by comparing the absolute value of Delta_Y1 with the absolute value of a predefined threshold at decision diamond 50. It is necessary to detect the steady state condition to handle the bias from Y1 and Phi1_vector. If the stead state condition is met, then Delta_Y1 will be less than the threshold and should be about zero. The steady state condition must be met continuously for a predetermined period of time. If the steady state condition is met, then the counter is increased by 1 at box 52, and the estimator 14 determines if the count has reached a predetermined maximum count at decision diamond 54 for this purpose. If the count is greater than the predetermined maximum count, then a steady state flag is set to true at box 56. If the steady state condition is met, Phi1_vector is replaced by Phi2_vector. When the steady state is set to true at the box 56, Y1 and Phi1_vector are recalculated at box 58. The estimator 14 returns Y1, Y2, Phi1_vector, Phi2_vector and the steady state flag at box 64.

If the count is less than the maximum count, the estimator 14 sets the steady state flag to false at box 60. Also, if Delta_Y1 is greater than the predetermined threshold at the decision diamond 50, meaning no steady state condition, then the count is set to zero at box 62, and the steady state flag is set to false at the box 60. For the non-steady state condition, the bias can be removed by using a difference for Y1 and Phi1_vector and, therefore, the original Y1, Y2, Phi1_vector, Phi2_vector and the steady state flag are returned at the box 64.

Returning to FIG. 2, the estimator 14 then determines if the enable_flag output from the detector 16 is set at decision diamond 70. If the enable_flag is set to true, then the estimator 14 executes the linear parameter estimation algorithm at box 72 to update the understeer coefficient, the front turning compliance and the rear turning compliance estimates at the output of the estimator 14. The linear parameter estimation algorithm updates the raw parameters theta_hat_11, theta_hat 12, theta_hat_21 and theta_hat_22 using the converted data Y1, Y2, Phi1_vector and Phi2_vector. In one embodiment, the linear parameter estimation algorithm employs a recursive least squares algorithm. However, an alternate algorithm, such as a Lyapunov-based algorithm, can be used. The estimated understeer coefficient, defined as Kus_hat, is then set to theta_hat_11, the estimated front cornering compliance, defined as Df_hat, is set to (theta_hat_11 plus theta_hat_21)/2 and the estimate rear cornering compliance, defined as Dr_hat, is set to (theta_hat_21−theta_hat_11)/2 at box 74. The values Kus_hat, Df_hat and Dr_hat are returned at box 76 at the output of the parameter estimator 14.

If the enable_flag is not set to true at the decision diamond 70, then the previous values for theta_hat_11, theta_hat_12, theta_hat_21 and theta_hat_22 are used to calculate the estimated understeer coefficient Kus_hat, the estimated front cornering compliance Df_hat and the estimated rear cornering compliance Dr_hat at the box 74.

Figure 4:
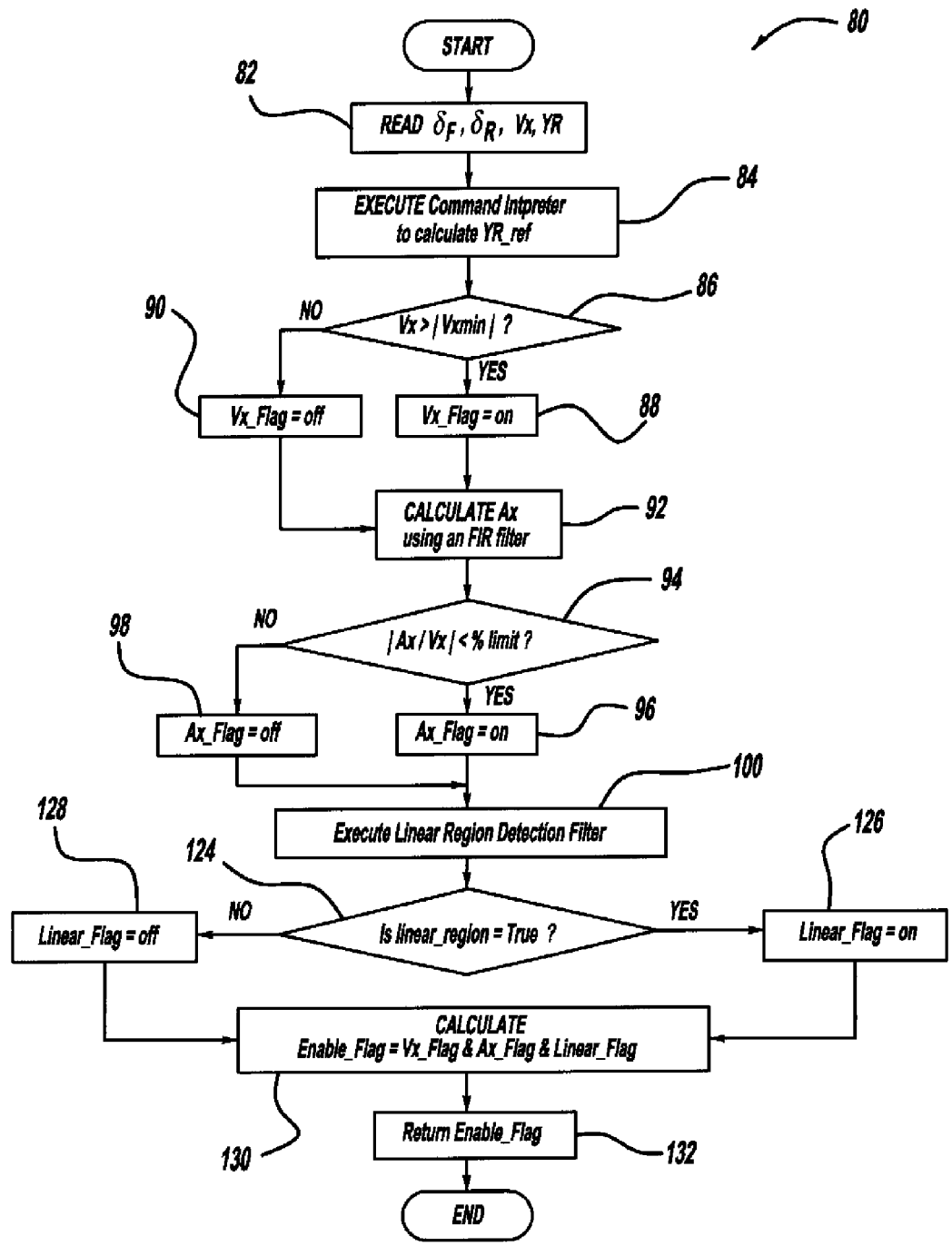
FIG. 4 is a flow chart diagram showing the operation of a vehicle condition detector of the system shown in FIG. 1.

FIG. 4 is a flow chart diagram 80 showing the operation of the vehicle condition detector 16 to determine whether to enable or disable the real-time vehicle parameter estimator 14. The estimator 14 is only effective when the vehicle 12 is operating in the linear range, i.e., when the vehicle speed Vx is not too low, the vehicle longitudinal acceleration Ax is not too high (accelerating or decelerating to quickly) and the vehicle yaw rate YR is not too great. The detector 16 reads the sensor signals of the front wheel steering angle $\delta_F$, the rear wheel steering angle $\delta_R$, the vehicle yaw rate YR and the vehicle speed Vx at box 82. The detector 16 calculates a reference yaw rate YR_ref using a command interpreter at box 84 that is used below to determine if the vehicle is in the linear region.

The detector 16 then determines whether the vehicle speed Vx is greater than the absolute value of a minimum speed Vxmin at decision diamond 86. The vehicle 12 must be traveling greater than a minimum vehicle speed, such as 10 mph, to be operating in the linear region because of kinematics effects. If the vehicle speed Vx is greater than the minimum value Vxmin, then the detector 16 sets a vehicle speed flag Vx_flag to on at box 88, otherwise it sets the Vx_flag to off at box 90.

The detector 16 then calculates the vehicle longitudinal acceleration Ax at box 92 using, for example, an FIR filter. The vehicle lateral acceleration Ax cannot be to high to be operating in the linear range. The detector 16 determines whether the vehicle longitudinal acceleration divided by the vehicle speed (Ax/Vx) is less than a predetermined percentage limit at decision diamond 94. If Ax/Vx is less than the percentage limit, then the detector 16 sets a vehicle longitudinal acceleration flag Ax_flag to on at box 96, otherwise it sets the vehicle acceleration flag Ax_flag to off at box 98.

The detector 16 uses a linear region detection filter at box 100 to determine if there is a difference between the vehicle yaw rate YR and the reference yaw rate YR_ref to determine a yaw rate error and indicate whether the vehicle is operating in the linear range. The error due to parameter deviation is usually much smaller than the error due to non-linearity. Therefore, if the error abruptly becomes larger than the specified error, the vehicle 12 is not operating in the linear region.

The detector 16 examines the yaw rate error and starts a count if the error is greater than a predetermined yaw rate threshold. When the count value is greater than a predetermined maximum count, the algorithm sets the linear region flag to false.

Figure 5:
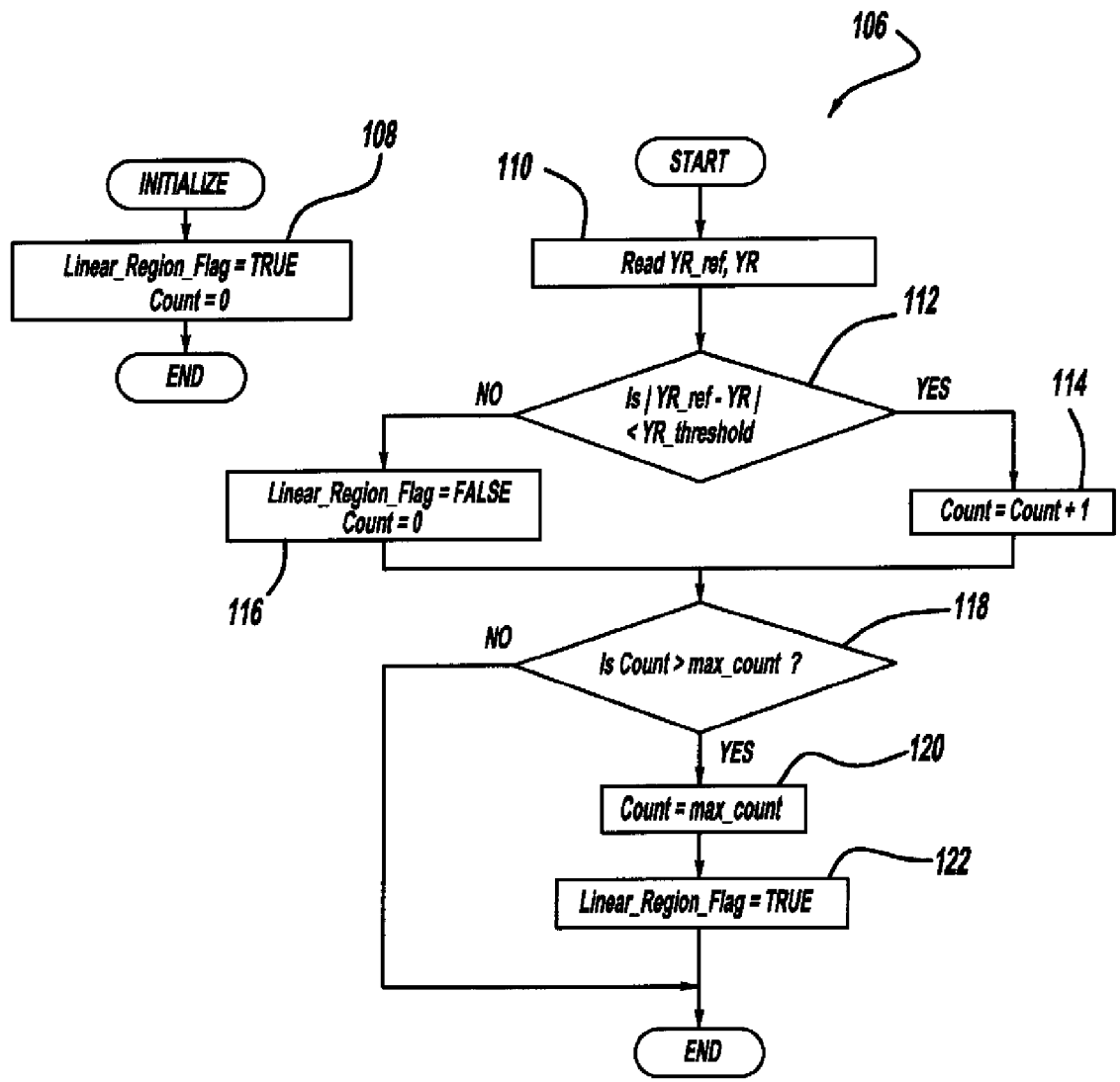
FIG. 5 is a flow chart diagram showing a process of linear-region detection for the vehicle condition detector of the system shown in FIG. 1.

FIG. 5 is a flow chart diagram 106 showing the operation of the linear region detection filter. The detector 16 first sets a linear region flag (Linear_Region_Flag) equal to true and a count equal to zero at box 108. The detector 16 then reads the yaw rate signal YR and the yaw rate reference signal YR_ref at box 110. The detector 16 then determines whether the absolute value of the yaw rate reference signal YR_ref minus the yaw rate signal YR is less than a predetermined yaw rate threshold YR_threshold at decision diamond 112. If the yaw rate reference signal YR_ref minus the yaw rate signal YR is less than the threshold YR_threshold, the linear region flag stays true, meaning that the vehicle 12 is operating in its linear range, and the count is increased by one at box 114. If the yaw rate reference signal YR_ref minus the yaw rate signal YR is greater than the yaw rate threshold (YR_threshold), the linear region flag is set to false and the count is left at zero at box 116.

The detector 16 then determines if the count is greater than a predetermined maximum count at decision diamond 118. If the count is greater than the maximum count, the detector 16 sets the count equal to the maximum count at box 120, and sets the linear region flag to true at box 122. If the count is not greater than the maximum count at the decision diamond 118, the linear region flag may be true or false, and the algorithm returns to the flow chart diagram 80 in FIG. 4.

The detector 16 then determines if the linear region flag is set to true at decision diamond 124. If the linear region flag is set to true, then the linear flag is set on at box 126, and if the linear region flag is set to false, then the linear flag is set off at box 128. The detector 16 then sets the enable flag to true only when all of the vehicle speed flag Vx_flag, the vehicle acceleration flag Ax_flag and the linear_region flag are true at box 130. The detector 16 then outputs the enable_flag at box 132.

Figure 6:
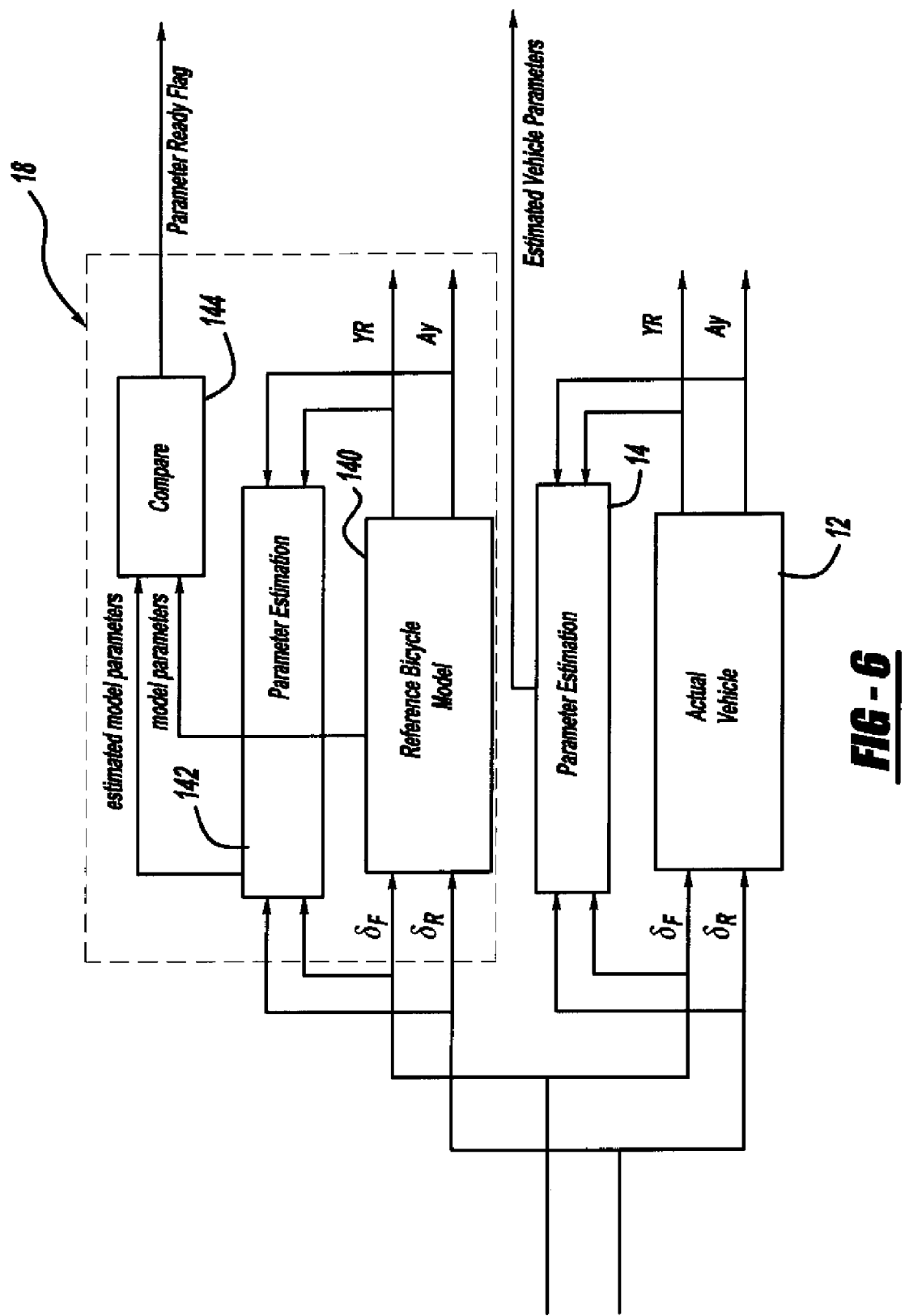
FIG. 6 is a block diagram of a rich steering input detector of the system shown in FIG. 1.

FIG. 6 is a block diagram of the vehicle 12, the vehicle parameter estimator 14 and the rich steering input detector 18. The rich steering input detector 18 is used to determine whether the output of the vehicle parameter estimator 14 is reliable enough. If the vehicle 12 is turning frequently enough and is operating in its linear region, then the outputs of the parameter estimator 14 converge to the true parameters. The conversion of the parameter estimation depends on the input excitation. However, it is hard to directly determine the richness of the input excitation so that the estimated parameter is converging to a true value. An indirect way of knowing the convergence of the parameter is to apply the same input to a model with known parameters to generate model outputs, and apply the series of parameter estimation procedures to estimate the parameters of the model. Since the model parameters are already known, determining whether the parameter estimation converges or not can be easily checked by comparing the model parameters and the estimated model parameters.

The rich steering input detector 18 includes a reference bicycle model process block 140, a parameter estimation process block 142 and a comparison process block 144. The reference bicycle model process block 140 outputs reference model vehicle parameters based on the front wheel steering angle $\delta_F$ and the rear wheel steering angle $\delta_F$. The parameter estimation block 142 determines the same outputs as the parameter estimator 14, where the estimated model parameters and the reference model parameters are compared in the comparison process block 144. If the two values are close enough, then the rich steering input detector 18 sets a parameter ready flag to on. The parameter ready flag indicates that the output of the parameter estimator 14 is reliable and ready to be used.

Figure 7:
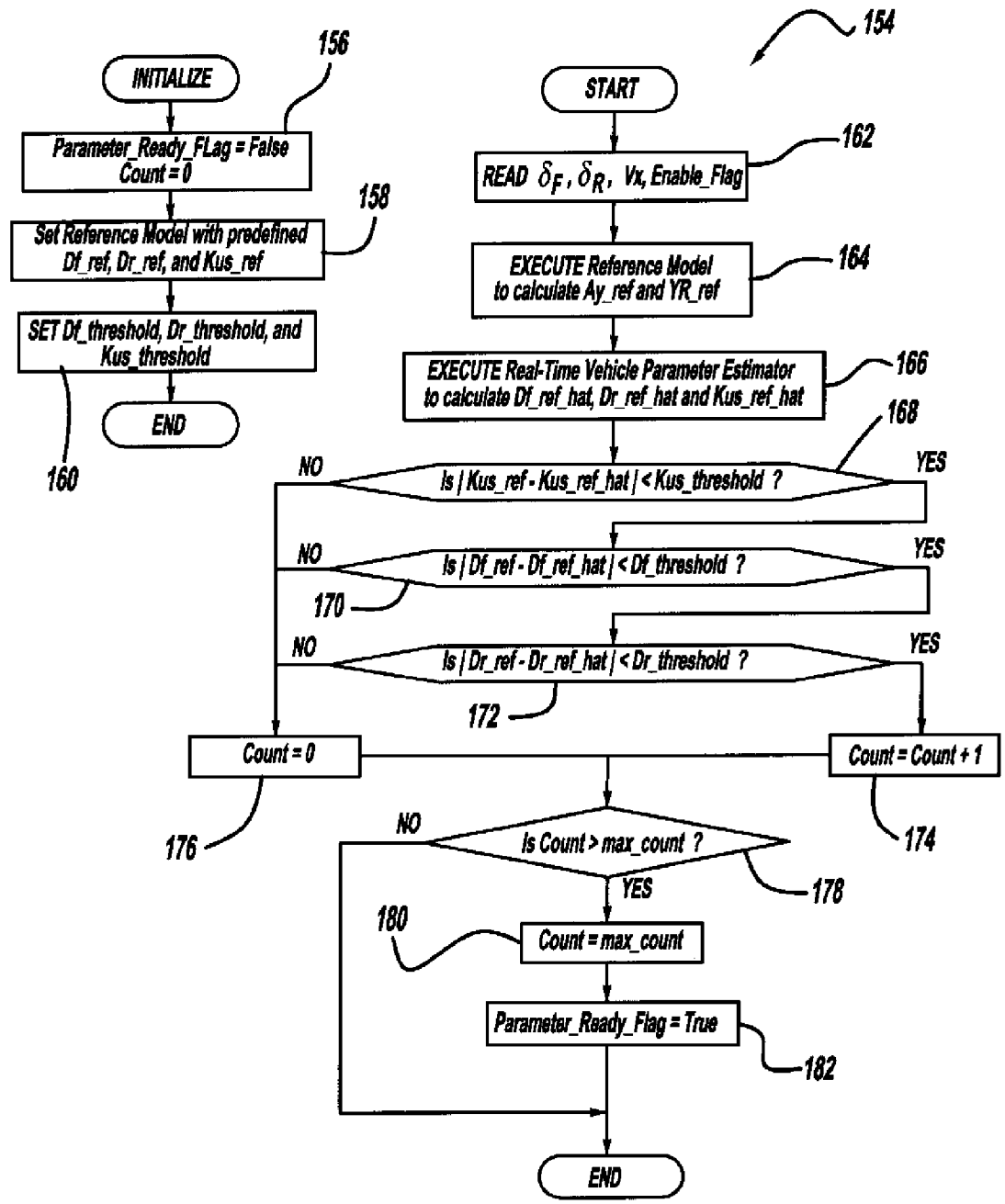
FIG. 7 is a flow chart diagram showing the operation of the rich steering input detector shown in FIG. 6.

FIG. 7 is a flow chart diagram 154 showing the operation of the rich steering input detector 18. The input detector 18 first initializes the algorithm by setting the parameter ready flag to false and a count to zero at box 156; provides the reference model with predetermined reference values for the understeer coefficient Kus_ref, the front cornering compliance Df_ref, and the rear cornering compliance Dr_ref at box 158; and sets predetermined threshold values for an understeer coefficient threshold Kus_threshold, a front cornering compliance threshold Df_threshold, and a rear cornering compliance threshold Dr_threshold at box 160.

The detector 18 then reads the sensor signals of the front wheel steering angle $\delta_F$, the rear wheel steering angle $\delta_R$, the vehicle speed Vx, and the enable_flag from the detector 16 at box 162. The rich steering input detector 18 then executes a reference model algorithm for the reference model 140 to calculate a lateral acceleration reference value Ay_ref and a vehicle yaw rate reference value YR_ref at box 164. The detector 18 then executes a real time vehicle parameter estimator to calculate estimated reference values for the understeer coefficient Kus-ref_hat, the front cornering compliance Df_ref_hat, and the rear cornering compliance Dr-ref_hat at box 166 as was done at the box 74 for the parameter estimator 14.

The detector 18 then determines if the absolute value of the difference between the reference understeer coefficient Kus_ref and the estimated reference understeer coefficient Kus_ref_hat is less than the understeer coefficient threshold Kus_threshold at decision diamond 168; whether the absolute value of the difference between the reference front cornering compliance Df_ref and the estimated reference front cornering compliance Df_ref_hat is less than the front cornering compliance threshold Df_threshold at decision diamond 170; and whether the absolute value of the difference between the reference rear cornering compliance Dr_ref and the estimated reference rear cornering compliance Dr_ref_hat is less than the rear cornering compliance threshold Dr_threshold at decision diamond 172. If all three of these comparisons are yes, than the counter is updated by one at box 174, and if any of these comparisons is no, than the count is set to zero at box 176.

The detector 18 then determines if the count is greater than a predetermined maximum count max_count at decision diamond 178. If the count is greater than the maximum count, then the count is set to the maximum count max_count at box 180 and the parameter ready flag is set to true at box 182. Otherwise the parameter ready flag remains set to false.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining estimated vehicle dynamics parameters, said method comprising:
estimating the vehicle parameters using input signals including a front wheel steering angle signal, a rear wheel steering angle signal, a vehicle lateral acceleration signal, a vehicle yaw rate signal and a vehicle speed signal, wherein estimating the vehicle parameters includes using a linear parameter estimation algorithm;
disabling the vehicle dynamics parameter estimation if the vehicle is not operating in a linear region including outputting a disable signal for disabling the vehicle dynamics parameter estimation; and
disregarding the estimated vehicle parameters if a rich steering input condition is not met and the estimated vehicle parameters are not reliable and are not ready to be used including outputting a disregard signal for disregarding the estimated vehicle parameters.

2. The method according to claim 1 wherein estimating the vehicle parameters includes estimating a vehicle understeer coefficient, a front cornering compliance and a rear cornering compliance.

3. The method according to claim 1 wherein estimating the vehicle parameters includes converting the input signals to converted values, executing the linear parameter estimation algorithm based on the converted values to generate estimation values, and calculating the vehicle parameters based on the estimation values.

4. The method according to claim 3 wherein converting the input signals to converted values includes filtering the signals, integrating the signals and generating regression vectors.

5. The method according to claim 1 wherein disabling the estimated vehicle parameters if the vehicle is not operating in a linear region includes disabling the estimated vehicle parameters if the vehicle is not traveling faster than a predetermined speed, the vehicle is accelerating or decelerating faster than a predetermined rate or the vehicle yaw rate is greater than a predetermined yaw rate.

6. The method according to claim 5 wherein determining if the vehicle yaw rate is greater than a predetermined yaw rate includes comparing the vehicle yaw rate to a reference yaw rate.

7. The method according to claim 1 wherein estimating the vehicle parameters includes determining if a steady state turning condition is met.

8. The method according to claim 1 wherein estimating the vehicle parameters includes using an algorithm selected from the group consisting of recursive least squares algorithms and Lyapunov-based algorithms.

9. The method according to claim 1 wherein disregarding the estimated vehicle parameters includes determining a reference model that has pre-defined reference model parameters, providing an estimation of the reference model parameters and comparing the estimation of the reference model parameters to the pre-defined reference model parameters.

10. A method for determining estimated vehicle dynamics parameters, said method comprising:
estimating a vehicle understeer coefficient, a front cornering compliance and a rear cornering compliance using a linear parameter estimation algorithm and input signals including a front wheel steering angle signal, a rear wheel steering angle signal, a vehicle lateral acceleration signal, a vehicle yaw rate signal and a vehicle speed signal;
disabling the vehicle dynamics parameter estimation if the vehicle is not traveling faster than a predetermined speed, the vehicle is accelerating or decelerating faster than a predetermined rate or the vehicle yaw rate is greater than a predetermined yaw rate, wherein disabling the vehicle dynamics parameter estimation includes outputting a disable signal for disabling the vehicle dynamics parameter estimation; and
disregarding the estimated vehicle parameters if a rich steering input condition is not met and the estimated vehicle parameters are not reliable and are not ready to be used, wherein disregarding the estimated vehicle parameters includes determining a reference model that has pre-defined reference model parameters, providing an estimation of the reference model parameters and comparing the estimation of the reference model parameters to the pre-defined reference model parameters, wherein disregarding the estimated vehicle parameters includes outputting a disregard signal for disregarding the estimated vehicle parameters.

11. The method according to claim 10 wherein estimating the vehicle parameters includes converting the input signals to converted values, executing the linear parameter estimation algorithm based on the converted values to generate estimation values, and calculating the vehicle parameters based on the estimation values.

12. The method according to claim 11 wherein converting the input signals to converted values includes filtering the signals, integrating the signals and generating regression vectors.

13. The method according to claim 10 wherein estimating the vehicle parameters includes determining if a steady state turning condition is met.

* * * * *